(12) United States Patent
Mochizuki et al.

(10) Patent No.: US 6,764,701 B1
(45) Date of Patent: Jul. 20, 2004

(54) FOOD EXTRUDER COOKING CONTROL METHOD AND COOKING CONTROL SYSTEM

(75) Inventors: Keizo Mochizuki, Sakado (JP); Taisuke Yamane, Sakado (JP); Kenjiro Ogo, Sakado (JP)

(73) Assignee: Meiji Seika Kaisha, Ltd., Tokyo (JP)

( * ) Notice: Subject to any disclaimer, the term of this patent is extended or adjusted under 35 U.S.C. 154(b) by 0 days.

(21) Appl. No.: 09/979,061
(22) PCT Filed: May 16, 2000
(86) PCT No.: PCT/JP00/03131
  § 371 (c)(1), (2), (4) Date: Nov. 19, 2001
(87) PCT Pub. No.: WO00/69288
  PCT Pub. Date: Nov. 23, 2000

(30) Foreign Application Priority Data

May 17, 1999 (JP) .......................................... 11-135695

(51) Int. Cl.⁷ .................................................. A23P 1/12
(52) U.S. Cl. ........................ 426/233; 426/496; 426/516
(58) Field of Search ............................... 426/231, 233, 426/496, 516, 523

(56) References Cited

U.S. PATENT DOCUMENTS 5,403,603 A * 4/1995 McCullough et al. ....... 426/233
5,464,642 A 11/1995 Villagran et al. ........... 426/439
5,577,410 A * 11/1996 Willard et al. .............. 426/233

FOREIGN PATENT DOCUMENTS

| JP | 62-195250 | 8/1987 |
| JP | 63-254320 | 10/1988 |
| JP | 5-56752 | 3/1993 |
| JP | 8-240316 | 9/1996 |
| JP | 10-136928 | 5/1998 |
| JP | 11-76782 | 3/1999 |

* cited by examiner

Primary Examiner—George C. Yeung
(74) Attorney, Agent, or Firm—Wenderoth, Lind & Ponack, L.L.P.

(57) ABSTRACT

A cooking control method and a cooking control system for a food extruder used for producing direct-puffed snacks includes a material supply mechanism, a hydration mechanism, a processing mechanism including an extruder, and a control computer. The control computer determines a specific power consumption value from the electric energy consumed by the extruder and the supplied amount of the dough material, at the time of producing snacks having excellent quality, to designate this value as a reference value, compares this reference value of the specific power consumption value with the actual specific power consumption value, and when the difference is small, controls the number of revolutions of the extruder, and when the difference is large, controls not only the number of revolutions of the extruder, but also the amount of water added and the feed amount of materials, to thereby stabilize the snack quality.

6 Claims, 3 Drawing Sheets

(A) Eating texture evaluation value

(a) Bubble size (b) Cutting stress

(B) Color tone evaluation value

(C) Volume evaluation value

FOOD EXTRUDER COOKING CONTROL METHOD AND COOKING CONTROL SYSTEM

TECHNICAL FIELD

The present invention relates to a cooking control method for a food extruder, used at the time when producing direct-puffed snacks, using corn, rice and pulses as raw materials.

BACKGROUND ART

Conventional direct-puffed snacks are produced by using grits of corn, rice and pulses as raw materials, using a single screw extruder or twin screw extruder.

The quality of produced snacks is adjusted by controlling the degree of cooking by means of the extruder. Normally, the control of the cooking degree is performed in such a manner that measured values of a thermometer, a pressure gauge and an ammeter mounted on the extruder, number of revolutions and feed amount, etc., are checked, and a skilled operator personally performs sensory evaluation of products discharged from a nozzle, and takes the above measured values and the results of the sensory evaluation into consideration in order to properly adjust the extruder based on the operator's experience.

However, the control of the cooking degree of the food extruder in the prior art depends mainly on the experience of the skilled operator, and the control procedure differs depending on the operator. Therefore, the quality of the product is not always constant.

Moreover, a great deal of experience and knowledge are required in order to become a skilled operator capable of producing excellent products, and it is difficult to control the extruder in a stable manner without being a skilled operator.

Furthermore, when a change in the material quality or a change of the material takes place, a long period of time is required for completing the adjustment of the extruder, and there is a disadvantage in that the productivity decreases during the adjustment period.

Also in the quality control, if the number of extruders controlled by one operator is increased, the quality control of the products produced by these extruders decreases, and therefore, there is a possibility that the difference in the quality of the products may increase.

On the other hand, an evaluation related to the quality of the produced puffed snack dough is performed by a sensory analysis. This sensory analysis is performed in such a manner that the quality of eating texture of the snack is divided into five stages, with point 5 being designated as the highest quality stage. If a product is evaluated as point 5 in the sensory analysis, then it is determined that there are no problems with the extruder. However, when a product is evaluated as less than a point 5, control of the extruder becomes necessary.

However, since it is not clear whether a cooking degree is too much or is not sufficient, by considering only the evaluation point, it is not possible to control the extruder based on the evaluation value alone.

The thermometer mounted on the food extruder is used for measuring the internal temperature of the machine itself, and not for measuring the temperature of the product. However, the internal temperature of the machine does not necessarily provide a close correlation with the product quality. Further, the relationship between the pressure and the product quality is not clear.

Therefore, it is an object of the present invention to provide a cooking control method for a food extruder, which can control cooking based on a measured value of a measuring instrument mounted on the extruder, and which can produce products having constant quality, without relying on the judgment of a skilled operator with respect to an operating state.

DISCLOSURE OF INVENTION

The cooking control method for the food extruder according to the present invention is characterized by performing control under computer management using fuzzy control in such a manner that a specific power consumption value is determined by dividing the electric energy consumed by a motor driving a rotational shaft of the food extruder in a unit time by the amount of dough material (hereinafter, also referred to as feed amount) supplied to the extruder in the unit time. The specific power consumption value at the time of producing snacks having excellent quality is designated as a reference value, and a control rule is established such that when a difference between the reference value of the specific power consumption value and the specific power consumption value is small, the number of revolutions of the food extruder is mainly controlled, and when the difference is large, the number of revolutions of the food extruder is controlled as well as the amount of water to be added, and the feed amount of the snack material.

The reference value of the specific power consumption value is a value with which a quality evaluation indicates as providing a snack having excellent quality. The reference value is set and controlled by a quality evaluation method wherein the quality evaluation of snacks is evaluated by physical measurements such as eating texture color tone and volume, thus differing from the conventional method. The eating texture is expressed by an eating texture evaluation value which is evaluated with a membership function value based on measured values of a bubble size of the snack and a cutting stress of the snack. The color tone is expressed by a color tone evaluation value which is evaluated with a membership function value based on a value measured using a spectrophotometric colorimeter. The volume is expressed by a volume evaluation value which is evaluated with a membership function value based on the weight of the snack stuffed in a container having a predetermined capacity. When there is even one defective evaluation value set in advance for each of the eating texture evaluation value, the color tone evaluation value and the volume evaluation value, the snack is estimated as having a defect in quality. When there is no defective evaluation value for each of the eating texture evaluation value, the color tone evaluation value and the volume evaluation value, each of the eating texture evaluation value, the color tone evaluation value and the volume evaluation value is multiplied by a weight coefficient distributed so as to approximate to the sensory evaluation value in the conventional method, so that the quality evaluation value can be obtained from the sum of the eating texture evaluation value, the color tone evaluation value and the volume evaluation value multiplied by the coefficients.

Moreover, the control method of an extruder according to the present invention is characterized in that upper limits, lower limits and adjusting values are determined for each of the number of revolutions, the feed amount of materials and the amount of water to be added, using as central values the specific power consumption value of the motor driving a rotational shaft of the extruder, the number of revolutions, the feed amount of materials and the amount of water added at the time of producing snacks having the most suitable quality evaluation value. The central value of the specific power consumption value is designated as a reference value, and the reference value of the specific power consumption value is compared with the specific power consumption value of the motor driving a rotational shaft of the extruder at the time of actual production of the snack. A result of the comparison is inputted into rules using a fuzzy theory, to thereby control each of the number of revolutions, the feed amount of snack materials and the amount of water to be added.

The rule based on the fuzzy theory is characterized in that each of an upper limit zone, a central zone, and a lower limit zone is set with each of the central values, serving as the reference values of the specific power consumption value, the upper limit and the lower limit, as the specific power consumption values. An adjusting value consisting of a predetermined value can be stepwise added to or subtracted from the number of revolutions within the range between the upper limit and the lower limit, in a manner as follows. When the specific power consumption value of the food extruder exists in the central zone formed of the reference value of the specific power consumption value, being the central value, adjusted with the positive/negative adjusting values, the number of revolutions, the feed amount of the materials and the amount of water added are maintained steady. When the specific power consumption value of the food extruder exists between the central zone and the upper limit, the number of revolutions is set to be the lower limit plus the adjusting value, and the feed amount of the materials and the amount of water added are set to be the central values. When the specific power consumption value of the food extruder exists between the central zone and the upper limit, and the number of revolutions is present at the lower limit plus the adjusting value, the number of revolutions is set to be the lower limit, and the feed amount of the materials and the amount of water added are set to be the central values. When the specific power consumption value of the food extruder exists between the central zone and the upper limit, and the number of revolutions is at the lower limit, the number of revolutions is set to be the lower limit, the feed amount of the materials is set to be the central value, and the amount of water added is set to be the upper limit. When the specific power consumption value of the food extruder exists between the central zone and the upper limit, the number of revolutions is at the lower limit and when the amount of water added is at the upper limit, the number of revolutions is set to be the lower limit, and the feed amount of the materials and the amount of water added are set to be the upper limits. When the specific power consumption value of the food extruder exists at the upper limit or above, the number of revolutions is set to be the lower limit, the feed amount of the materials is set to be the upper limit, and the amount of water added is set to be the upper limit. When the specific power consumption value of the food extruder exists between the central zone and the lower limit, the number of revolutions is set to be the upper limit minus the adjusting value, the feed amount of the materials is set to be the central value, and the amount of water added is set to be the central value. When the specific power consumption value of the food extruder exists between the central zone and when the lower limit, and the number of revolutions is at the upper limit minus the adjusting value, the number of revolutions is set to be the upper limit, the feed amount of the materials is set to be the central value, and the amount of water added is set to be the central value. When the specific power consumption value of the food extruder exists between the central zone and the lower limit and when the number of revolutions is at the lower limit, the number of revolutions is set to be the lower limit plus the adjusting value, the feed amount of the materials is set to be the central value, and the amount of water added is set to be the lower limit. When the specific power consumption value of the food extruder exists between the central zone and the lower limit and when the number of revolutions and the amount of water added are at the lower limits, the number of revolutions is set to be the upper limit minus the adjusting value, and the feed amount of the materials and the amount of water added are set to be the lower limits. When the specific power consumption value of the food extruder exists at the lower limit or below, the number of revolutions is set to be the upper limit, and the feed amount of the materials and the amount of water added are set to be the lower limits.

A cooking control system for a food extruder to be used in the present invention comprises feed means for adjusting the feed amount of the snack materials, hydration means for adjusting the amount of water to be added to the snack materials, processing means for heating and expanding the material dough obtained by mixing a predetermined amount of water in the snack materials with the food extruder to thereby produce the snacks, and control means for controlling the operating condition of each of the feed means, the hydration means and the processing means with a computer. A reference value of the specific power consumption value is obtained by dividing the electric energy consumed in a unit time by the drive motor which rotates the rotational shaft of the food extruder, at the time when the quality evaluations indicate the most suitable snack is obtained, by the amount of dough material supplied to the extruder in a unit time. The specific power consumption value is determined, per feed amount of the material actually supplied, from a ratio of the electric energy consumed at the time of actual production of snacks using the motor to the feed amount of the materials. The above-mentioned control means is controls the number of revolutions of the rotational shaft of the food extruder, when a relative difference between the reference value of the specific power consumption value and the specific power consumption value is small, and controls not only the number of revolutions but also an increase and decrease in the amount of water to be added, and an increase and decrease of the feed amount of the snack material, when the relative difference between the reference value of the specific power consumption value and the specific power consumption value is large.

The control means is characterized by determining each preferable value of the upper limit, the central value, the lower limit and the adjusting value for the specific power consumption value and the number of revolutions of the motor, the feed amount of materials and the amount of water added, based on the quality evaluation value of the most suitable snack, inputting the result of a comparison between the central value of the specific power consumption value and the actual power consumption of the motor, into the rule based on the fuzzy theory, and controlling each of the number of revolutions, the feed amount of snack materials and the amount of water added.

As a result, cooking control for the extruder, which has previously relied on skilled engineers, can be automated, thereby enabling stable production of the expanded snacks having an optimum quality.

The cooking control method for the food extruder according to the present invention will now be described, with reference to the drawings.

BEST MODE FOR CARRYING OUT THE INVENTION

Figure 1:
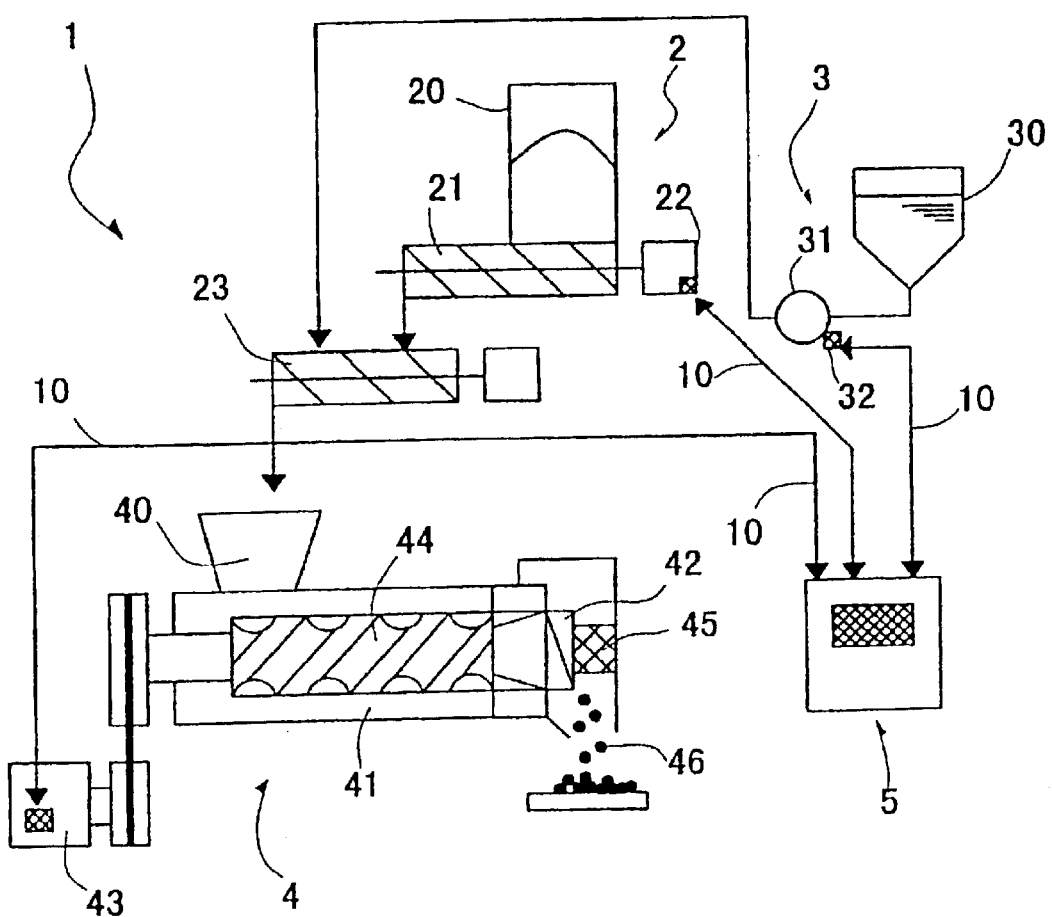
FIG. 1 is a schematic diagram of a system for executing a cooking control method for an extruder according to the present invention.

In FIG. 1, there is shown one example of a system for executing the cooking control method for a food extruder according to the present invention. This system 1 comprises feed means 2 for adjusting the feed amount of the snack materials, hydration means 3 for adjusting the amount of water to be added to the snack materials, processing means 4 for heating and expanding the dough material obtained by adding a predetermined amount of water to the snack materials and mixing the snack materials and water using the food extruder to produce the snacks, and control means 5 for controlling the operation of each of the feed means 2, the hydration means 3 and the processing means 4 with a computer. The feed means 2 comprises a material tank 20 for temporarily storing the snack materials, a feeder 21 for supplying a predetermined amount of snack materials from the tank, and a feeder controller 22 for controlling an increase and decrease of the feed amount of the snack materials in the feeder.

The hydration means 3 comprises a tank 30 for temporarily storing water, a pump 31 for adding a predetermined amount of water from the tank 30 to the materials, and a pump controller 32 for controlling an increase and decrease of the amount of water to be added by the pump 31.

Used as the processing means 4 is a food extruder comprising a hopper 40 for supplying the dough material, obtained by adding a predetermined amount of water to the snack materials and mixing them, into the processing means; a heating cylinder 41 for heating the dough material; a die 42 for expanding the heated dough material; and a rotor (screw) 44 which is disposed inside the heating cylinder 41 and is rotated by a motor 43 (hereinafter, the processing means 4 may be referred to as an extruder 4).

For the extruder 4, a single screw extruder or a twin screw extruder may be used.

Inside the motor 43 for rotating the rotor of the extruder 4, though not shown, is provided a watt-meter that can measure the power consumption of the motor 43, and a tachometer that can measure the number of revolutions of the motor 43.

The control means 5 is connected to each of the feeder controller 22, the pump controller 32 and the motor 43 with cables 10, and has a function of controlling the operation of each of the feed means 2, the hydration means 3 and the processing means 4, so that snacks having the optimum quality can be obtained, based on the specific power consumption value obtained by detecting the power consumption of the motor 43 and dividing the power consumption by the feed amount.

That is to say, the specific power consumption value calculated from the feed amount (kg/hr) of the materials relative to the electric energy consumed by the motor 43 in a unit time, at the time when "the quality evaluation value of the snack" most suitable as the product is obtained, is set in advance as the "reference value" in the control means 5. Based on this reference value, the number of revolutions of the motor 43, the feed amount of the materials and the amount of water added can be controlled through the "fuzzy theory".

The present invention will be described below, focusing on the "quality evaluation value of the snack", "reference value" and "fuzzy theory".

The "quality evaluation value of the snack" can be evaluated by a physical property. That is to say, the quality evaluation of the snack, which has previously been performed by sensory evaluation, can be performed by substituting an eating texture evaluation value based on the measured values of the bubble size of the snack and a cutting stress of the snack, a color tone evaluation value obtained by measuring the snack surface with a spectrophotometric calorimeter, and a volume evaluation value obtained by measuring the weight of the snack stuffed in a container having a predetermined capacity, in the following expression.

Quality evaluation value=$k\{w1\times$(eating texture evaluation value)+$w2\times$(color tone evaluation value)+$w3\times$(volume evaluation value)$\}$  (Expression 1)

Here, the eating texture evaluation value, the color tone evaluation value and the volume evaluation value are respectively expressed by a membership function value (0 to 1). Moreover, w1, w2 and w3 are coefficients indicating a weight in each evaluation value, and distributed in accordance with the membership function value, so as to become w1+w2+w3=1.

The k value is designated as a coefficient, which becomes 0 when a common sum of the membership function values with physical evaluation values (the smallest value in sequence terms) is 0, and which becomes 1 when the common sum is larger than 0. Therefore, for example, when the color tone evaluation value is 0, even if other evaluation values show 1, which is the highest quality value, since a snack having poor color tone is not suitable as a product, the calculated quality evaluation value is made 0, and evaluated as a defective product.

The calculation method for each of the eating texture evaluation value, the color tone evaluation value and the volume evaluation value will be described, with reference to FIG. 2.

Figure 2:
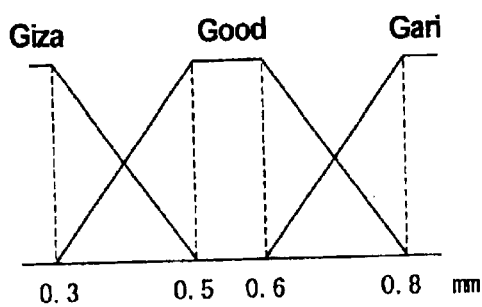
FIG. 2 is a diagram showing the relation between respective physical values of eating texture evaluation value, color tone evaluation value and volume evaluation value and the quality, by a fuzzy membership function.
Figure 2:
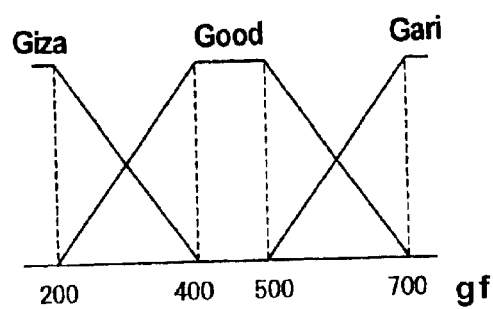
Figure 2:
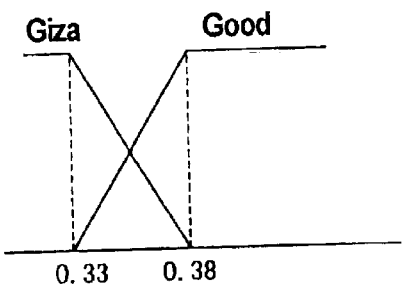
Figure 2:
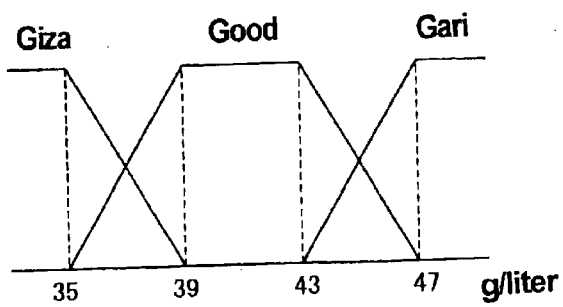

FIG. 2 shows the relationship between respective physical values of eating texture evaluation value, color tone evaluation value and volume evaluation value, and the quality, with regard to a corn snack product produced using corn grits as a raw material, by a fuzzy membership function.

(A) The eating texture evaluation value is formed of the physical values of (a) bubble size and (b) cutting stress.

(a) Measurement of the bubble size is performed by cutting the produced snack, and measuring bubbles when the cut surface is magnified by 20 times, in order to make the measurement of the bubble size easy. The bubble size which is designated as the highest quality product (point 1) in the corn snack products is from 0.5 to 0.6 mm for the average value of 50 measured products. A product having an average bubble size smaller than 0.5 mm has a tendency to overcook, and a product having an average bubble size of 0.3 mm or smaller is evaluated as being completely over-cooked (Giza) and evaluated as a defective product (point 0). On the other hand, a product having an average bubble size larger than 0.6 mm has a tendency to cook slightly insufficiently, and a product having an average bubble size of 0.8 mm or larger is evaluated as being completely insufficiently cooked (Gari). This product is evaluated as a defective product (point 0) in a similar manner as described above.

(b) Measurement of the cutting stress is performed by using a rheometer, and measuring an average maximum stress value when 50 snacks are cut by a wire having a diameter of 0.3 mm.

The average cutting stress designated as the highest quality product (point 1) in the corn snack products has an average value of 400 to 500 gf of the 50 measured products. A product having the average cutting stress of smaller than 400 gf has a tendency to overcook, and a product having an average value of 200 gf or less is evaluated as being completely over-cooked (Giza) and evaluated as a defective product (point 0). On the other hand, a product having an average cutting stress larger than 500 gf has a tendency to cook slightly insufficiently, and a product having an average cutting stress of 700 gf or more is evaluated as being completely insufficiently cooked (Gari), and evaluated as a defective product (point 0).

The bubble size and the cutting stress evaluated as described above are calculated as the eating texture evaluation value from the expression 2 described below.

Eating texture evaluation value=$w1$×(bubble size evaluation point)+$w2$×(cutting stress evaluation point)  (Expression 2)

Wherein, w1 and w2 are coefficients distributed in accordance with the membership function value, and in the corn snack products, w1=0.4, and w2=0.6.

That is to say, the sum of a value obtained by multiplying the bubble size evaluation point by 0.4, and a value obtained by multiplying the cutting stress evaluation point by 0.6 is designated as the eating texture evaluation value.

(B) The color tone evaluation value is obtained by measuring a "b" value of the color difference analysis value according to the Hunter's notation, using the spectrophotometric calorimeter.

The b value which is designated as the highest quality product (point 1) in the corn snack products has an average value of 0.38 or higher of 50 measured products. The product having the b value of smaller than 0.38 has a tendency to over-cook, and a product having the b value of 0.33 or less is evaluated as being completely over-cooked (Giza) and evaluated as a defective product (point 0).

(C) The volume evaluation value is obtained by measuring the weight (g) of the snack dough stuffed in a container having a capacity of 1 liter.

The volume which is designated as the highest quality product (point 1) in the corn snack products is from 39 to 43 g per liter. In the case of less than 39 g per liter, the volume is likely to be excessive, and cooking also is likely to be excessive. Moreover, in the case of 35 g per liter or less, the product is completely over-cooked (Giza), and is evaluated as a defective product (point 0). On the other hand, a product having a volume exceeding 43 g per liter is likely to be cooked insufficiently. Moreover, a product having a volume of not smaller than 47 g per liter is in a completely insufficiently cooked state (Gari), and is evaluated as a defective product (point 0).

Quality evaluation value can be obtained by substituting respective evaluation values obtained in the above-described manner in Expression 1 recited above and repeated below:

Quality evaluation value=$k\{w1$×(eating texture evaluation value)+ $w2$×(color tone evaluation value)+$w3$×(volume evaluation value)$\}$  (Expression 1).

Since each value of the eating texture evaluation value, the color tone evaluation value and the volume evaluation value is expressed by a point evaluation from 0 to 1, the quality evaluation value is also expressed by a point of from 0 to 1. By increasing the point in evaluation by five times, it can be made so as to agree with the sensory evaluation value of the 5-point evaluation.

In the calculated quality evaluation value, point 1 is a value showing the highest quality product, and point 0 shows a completely defective product. The acceptable line can be optionally set, but it is desirable that products supplied to the market have a point not lower than 0.8.

However, in the case where any of the eating texture evaluation value, the color tone evaluation value or the volume evaluation value is evaluated as point 0, the product has no value as a snack product. In this case, the quality evaluation value is made 0 point based on the k value, and this product is treated as a defective product.

The correlation between the quality evaluation value expressed in this manner and the sensory evaluation value by 10 specialty panelists in the conventional method has been examined, and as a result, the correlation could be recognized as a correlation coefficient being as high as 0.98.

The "reference value" is a specific power consumption value obtained by dividing the power consumption (Pw) of the extruder in a unit time, at the time when the most suitable quality evaluation of snacks can be obtained as a result of the evaluation by the above-described method, by the amount of the dough material (kg) supplied in the unit time. Based on this reference value, the range of the electric energy consumed by the motor 43 is set in advance in the control means 5 so that snacks having the most suitable quality can be obtained.

This range consists of an upper limit zone (Pw=pwB±Δp), a central zone (Pw=pwm±Δp), and a lower limit zone (Pw=pwL±Δp), having positive and negative adjusting values for each of the upper limit, the central value and the lower limit.

At the same time, the central value (R=rm), the lower limit (R=rL), the upper limit (R=rB) and the adjusting value (Δr) of the number of revolutions of the motor 43 are set. The adjusting value (Δr) is used for adding to or subtracting from the upper limit and the lower limit stepwise.

In addition, the central value (F=fm), the lower limit (F=fL) and the upper limit (F=fB) of the feed amount of the materials, and the central value (W=wm), the lower limit (W=wL) and the upper limit (W=wB) of the amount of water added are set as well.

After having set these values in the control means 5, the operation of the extruder 4 is started. Then, after a predetermined period of time, the system enters a control state.

At the time when the number of revolutions of the motor reaches the central value (R=rm), water adjusted to the central value (W=wm) by the pump controller 32 is added to a hydration mixer 23 by the pump 31. At the same time, snack materials set to the central value (F=fm) by the feeder controller 22 is deposited into the hydration mixer 23 by the feeder 21. After having been stirred and mixed well, the dough material is obtained and deposited into the hopper 40 of the extruder 4.

The deposited dough material is extruded to the die section 42, while being heated by the rotation of the rotor 44 arranged inside of the extruder 4, and expanded and formed into a desired shape.

At the tip of the die section 42, a cutter 45 is mounted, for cutting the expanded and formed snack into a predetermined size, thereby obtaining an expanded snack 46.

Here, the control means 5 performs a comparison operation of the specific power consumption value of the above-mentioned motor 43 per the amount of the actually supplied dough material with the preliminarily set reference value, based on the "fuzzy theory".

As a result, when the relative difference between the specific power consumption value and the reference value is small, control of the number of revolutions is performed, so as to adjust the revolution number so that high quality expanded snacks can be obtained.

On the other hand, when the relative difference between the specific power consumption value and the reference value is large, since adjustment cannot be achieved only by the control of the number of revolutions, in addition to the control of the number of revolutions, control of an increase or decrease of amount of water to be added, and control of an increase or decrease of the feed amount of the snack material are also performed. As a result, the production conditions are properly set so that good quality expanded snacks can be obtained.

The operation control with use of the "fuzzy theory" is performed based on the following rules.

Rule 1

When the specific power consumption value of the motor exists in the central zone, [if Pw=pwm±Δp], the number of revolutions, the feed amount of materials and the amount of water added are kept as they are, [then R=keep, F=keep, W=keep].

Wherein, Pw denotes the specific power consumption value, pwm denotes the specific power consumption value in the central zone, Δp denotes an adjusting value (a range where the quality difference is not recognized, if being within this adjusting value), R denotes the number of revolutions of the extruder, F denotes the feed amount (the amount of materials to be supplied per unit time), and W denotes the amount of water added.

Rule 2

When the specific power consumption value of the motor exists between the central zone and the upper limit, [if (pwm+Δp)<Pw<pwB], the number of revolutions is set to be the lower limit+the adjusting value, and the feed amount of materials and the amount of water added are set to be the central values, [then R=rL+Δr, F=fm, W=wm].

Wherein, pwB denotes the specific power consumption value of the upper limit, (rL+Δr) denotes the number of revolutions of the lower limit+the adjusting value, fm denotes the central value of the feed amount, and wm denotes the central value of the amount of water added.

Rule 3

When the specific power consumption value of the motor exists between the central zone and the upper limit, and the number of revolutions exists at the lower limit+the adjusting value, [if (pwm+Δp)<Pw<pwB], R=rL+Δ], the number of revolutions is set to be the lower limit, and the feed amount of materials and the amount of water added are set to be the central values, [then R=rL, F=fm, W=wm].

Rule 4

When the specific power consumption value of the motor exists between the central zone and the upper limit, and the number of revolutions exists at the lower limit, [if (pwm+Δp)<Pw<pwB, R=rL], the number of revolutions is set to be the lower limit, the feed amount of materials is set to be the central value and the amount of water added is set to be the upper limit, [then R=rL, F=fm, W=wB].

Wherein, wB denotes the upper limit of the amount of water added.

Rule 5

When the specific power consumption value of the motor exists between the central zone and the upper limit, the number of revolutions exists at the lower limit and the amount of water added exists at the upper limit, [if (pwm+Δp)<Pw<pwB, R=rL, W=wB], the number of revolutions is set to be the lower limit, the feed amount of materials and the amount of water added are set to be the upper limits, [then R=rL, F=fB, W=wB].

Wherein, fB denotes the upper limit of the feed amount.

Rule 6

When the specific power consumption value of the motor exists at the upper limit or above, [if Pw≧pwB], the number of revolutions is set to be the lower limit, the feed amount of materials is set to be the upper limit and the amount of water added is set to be the upper limit, [then R=rL, F=fB, W=wB].

Wherein, pwB denotes the upper limit of the specific power consumption value.

Rule 7

When the specific power consumption value of the motor exists between the central zone and the lower limit, [if (pwm−Δp)>Pw>pwL], the number of revolutions is set to be the upper limit−the adjusting value, and the feed amount of materials is set to be the central value and the amount of water added is set to be the central value, [then R=rB−Δr, F=fm, W=wm].

Wherein rB denotes the upper limit of the number of revolutions.

Rule 8

When the specific power consumption value of the motor exists between the central zone and the lower limit, and the number of revolutions exists at the upper limit−the adjusting value, [if (pwm−Δp)>Pw>pwL, R=rB−Δr], the number of revolutions is set to be the upper limit, and the feed amount of materials is set to be the central value and the amount of water added is set to be the central value, [then R=rB, F=fm, W=wm].

Rule 9

When the specific power consumption value of the motor exists between the central zone and the lower limit, and the number of revolutions exists at the lower limit, [if (pwm−Δp)>Pw>pwL, R=rL], the number of revolutions is set to be the lower limit+the adjusting value, the feed amount of materials is set to be the central value and the amount of water added is set to be the lower limit, [then R=rL+Δr, F=fm, W=wL].

Rule 10

When the specific power consumption value of the motor exists between the central zone and the lower limit, and the number of revolutions and the amount of water added exist at the lower limit, [if (pwm−Δp)>Pw>pwL, R=rL, W=wL], the number of revolutions is set to be the upper limit−the adjusting value, and the feed amount of materials and the amount of water added are set to be the lower limits, [then R=rB−Δr, F=fL, W=wL].

Rule 11

When the specific power consumption value of the motor exists at the lower limit or below, [if Pw≦pwL], the number of revolutions is set to be the upper limit, and the feed amount of materials and the amount of water added are set to be the lower limits, [then R=rB, F=fL, W=wL].

TEST EXAMPLE 1

Correlation Between the Physical Value and the Measured Value

In order to complete the cooking control method for the extruder according to the present invention, it is required that there is a high correlation between respective physical values of the bubble size, the cuffing stress, the color tone and the volume, which the expanded snacks having the most suitable quality have, and the values measured by a measuring instrument mounted on the drive controller.

Therefore, snacks were produced using a single screw extruder (manufactured by Heinz Schaaf Co., Germany) and using corn grits as a material, to verify the correlation between the physical values and the measured values.

At first, good quality snacks were produced by cooking, while properly changing the number of revolutions of the extruder, the amount of water and the grits, etc. under feeding condition of 250 kg/hr of yellow corn grits, using a nozzle having eight nozzle holes having a thickness of 1.0 mm and the length of 8 mm engraved in the die section of the extruder.

50 pieces of the obtained snacks were used as samples to be tested, to measure the average size of the bubble on the cut surface, the average cutting stress, the volume, and the L value and the b value based on the color difference analysis, with respect to the samples to be measured.

The bubble size was determined in such a manner that after the samples to be tested had been cut, the cut surface was magnified by 20 times, and 100 bubbles were measured, to thereby obtain the average of 50 samples to be tested per one bubble.

The cutting stress was determined in such a manner that a rheometer (manufactured by Zenken Co., Ltd.) was used to measure the maximum stress at the time when the samples to be tested were cut by a wire having a diameter of 0.3 mm, to thereby obtain the average maximum stress value of 50 samples to be tested.

The volume was determined by measuring the weight of the dough of the sample to be tested stuffed in a container having a capacity of 1 liter.

With regard to the color tone, the color tone on the surface of the sample to be tested was measured using a spectrophotometric colorimeter (model CM525I manufactured by Minolta Co.) to thereby determine the L value and the b value.

On the other hand, with regard to the measured value, using the same extruder as described above, the specific power consumption value obtained by dividing the power consumption of the drive motor for rotating the rotor of the extruder by the feed amount of the materials (kg), the pressure at the nozzle section as a measured value of the pressure gauge mounted in the die section, the dough temperature obtained by measuring the product temperature of the expanded snack dough discharged from the nozzle in the die section by a radiation thermometer, and the temperature of the nozzle section in the measurement of the thermometer mounted in the die section, were measured.

From the above physical values and the above measured values, the correlation coefficients between the physical values and the measured values were determined. As a result, as shown in Table 1, it could be recognized that each of the average size of the bubbles on the cut surface of the snack, the cutting stress, the volume and the color tone (b value) has an especially high correlation coefficient with the specific power consumption value.

On the other hand, the L value in the color tone has a high correlation only with the dough temperature, and each of the pressure in the nozzle section and the temperature of the nozzle section has low correlation with the physical evaluation values.

TABLE 1

| Physical value | | Measured value | | | |
|---|---|---|---|---|---|
| | | Specific power consumption value | Pressure in nozzle sec. | Dough temperature | Temperature of nozzle sec. |
| Bubble size | | 0.986 | 0.411 | 0.504 | 0.715 |
| Cutting stress | | 0.968 | 0261 | 0.564 | 0.768 |
| Volume | | 0.952 | 0.093 | 0.566 | 0.807 |
| Color Tone | L value | 0.707 | 0.089 | 0.913 | 0.308 |
| | b value | 0.920 | 0.231 | 0.668 | 0.666 |

Based on the above results, the relations between the specific power consumption value and each of the bubble size, the cutting stress, the b value and the volume were verified in detail.

Figure 3:
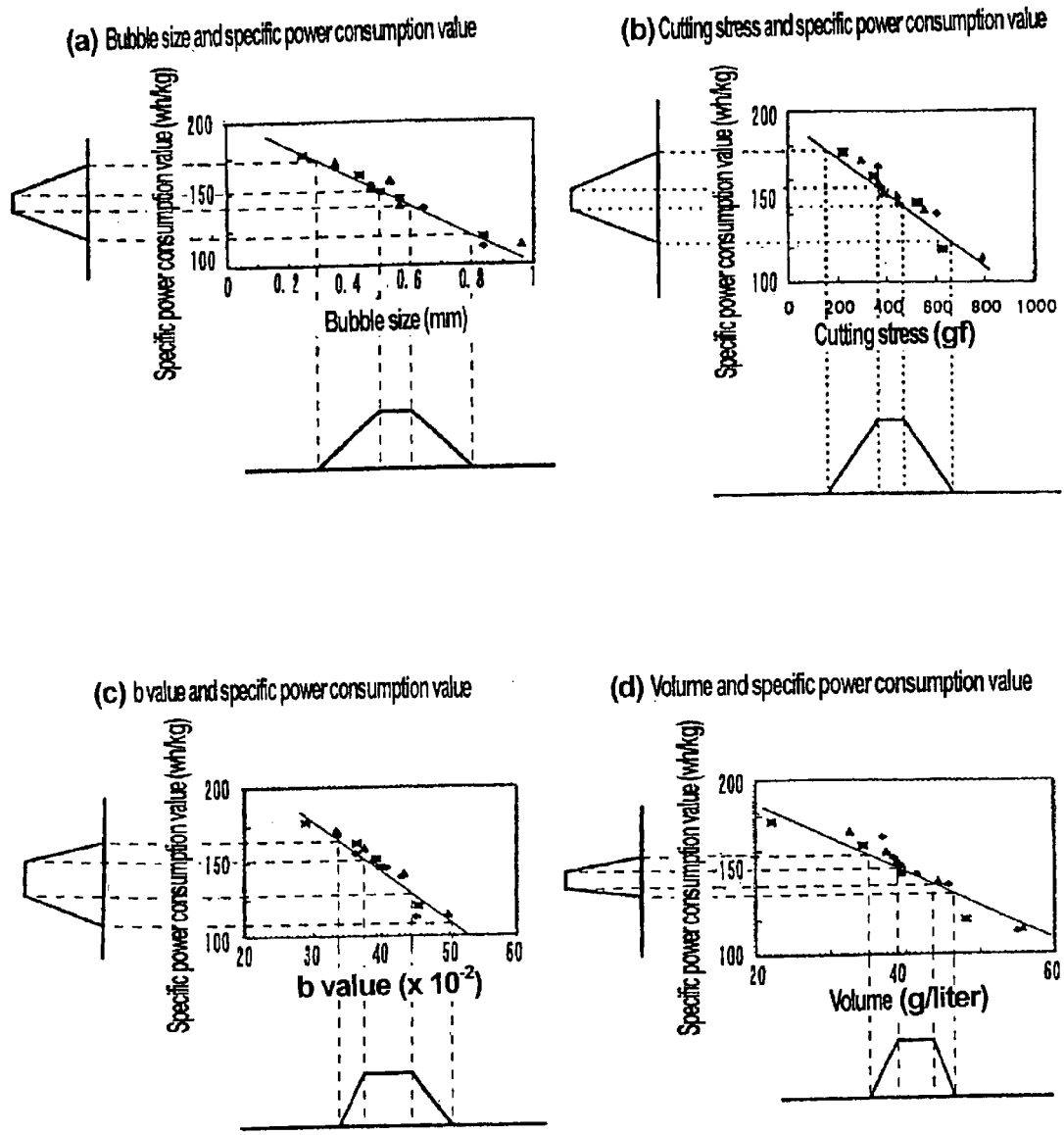
FIG. 3 is a diagram showing the correlation between the physical measurements and the specific power consumption value.

FIG. 3 shows the correlation between the respective physical measurements of the bubble size, the cutting stress, the b value and the volume, and specific power consumption value.

As is obvious from FIG. 3, a constant correlation was recognized between each of the respective physical measurements of the bubble size, the cutting stress, the b value and the volume, and specific power consumption value.

Specifically, in order to obtain the bubble size (0.5 to 0.6 mm) of the snack having the most suitable quality, it is desirable to maintain the specific power consumption value in the range of from 142 to 152 wh/kg (see FIG. 3(a)). In order to obtain the cutting stress (400 to 500 gf) of the snack having the most suitable quality, it is desirable to maintain the specific power consumption value in the range of from 144 to 156 wh/kg (see FIG. 3(b)). In order to obtain the b value (0.33 to 0.38) of the snack having the most suitable quality, it is desirable to maintain the specific power consumption value in the range of from 130 to 152 wh/kg (see FIG. 3(c)). Also, in order to obtain the volume (39 to 43 g/liter) of the snack having the most suitable quality, it is desirable to maintain the specific power consumption value in the range of from 140 to 158 wh/kg.

From the above results, it was found that the eating texture evaluation value, the color tone evaluation value and the volume evaluation value for evaluating the product quality could be controlled by the specific power consumption value per 1 kg of the material.

Moreover, the range of the specific power consumption value satisfying the condition that the product has the most suitable quality with respect to all the items of the eating texture (consisting of the bubble size and the cutting stress), the color tone and the volume is from 144 to 152 wh/kg. Therefore, it became clear that by using this range as the reference value, the quality of the snack products could be controlled.

EXAMPLE 1

Cooking Control of the Extruder

Next, the result of producing the puffed snacks using the cooking control method and the cooking control system for the food extruder according to the present invention will be described below.

For the extruder, a collet-type single screw extruder (manufactured by Heinz Schaaf Co., Germany) was used, and the following set values were inputted beforehand in the control computer.

Target power consumption
  Central zone: $Pwm=(pwm\pm\Delta p)=148\pm 4$ wh/kg
  Lower limit zone: $PwL=(pwL\pm\Delta p)=140$ wh/kg$\pm 4$ wh/kg
  Upper limit zone: $PwB=(pwB\pm\Delta p)=156$ wh/kg$\pm 4$ wh/kg
Control value of number of revolutions
  Central value: $R=rm=650$–$675$ rpm
  Lower limit: $R=rL=650$ rpm
  Upper limit: $R=rB=675$ rpm
  Adjusting value: $\Delta r=25$ rpm
Control value of feed amount of materials
  Central value: $F=fm=195$–$200$ kg/hr
  Lower limit: $F=fL=195$ kg/hr
  Upper limit: $F=fB=200$ kg/hr–by 5 kg/hr reduction
Control value of amount of water added
  Central value: $W=wm=2\%$ addition
  Lower limit: $W=wL=1\%$ addition
  Upper limit: $W=wB=3\%$ addition
As the control rules, the following rules were inputted.

| | |
|---|---|
| Rule 1: | if $Pw = pwm \pm \Delta p$ |
| | then $R$ = keep, $F$ = keep, $W$ = keep |
| Rule 2: | if $(pwm + \Delta p) < Pw < pwB$ |
| | then $R = rL + \Delta r$, $F = fm$, $W = wm$ |
| Rule 3: | if $(pwm + \Delta p) < Pw < pwB$], $R = rL + \Delta r$ |
| | then $R = rL$, $F = fm$, $W = wm$ |
| Rule 4: | if $(pwm + \Delta p) < Pw < pwB$, $R = rL$ |
| | then $R = rL$, $F = fm$, $W = wB$ |
| Rule 5: | if $(pwm + \Delta p) < Pw < pwB$, $R = rL$, $W = wB$ |
| | then $R = rL$, $F = fB$, $W = wB$ |
| Rule 6: | if $Pw \geq pwB$ |
| | then $R = rL$, $F = fB$, $W = wB$ |
| Rule 7: | if $(pwm - \Delta p) > Pw > pwL$ |
| | then $R = rB - \Delta r$, $F = fm$, $W = wm$ |
| Rule 8: | if $(pwm - \Delta p) > Pw > pwL$, $R = rB - \Delta r$ |
| | then $R = rB$, $F = fm$, $W = wm$ |
| Rule 9: | if $(pwm - \Delta p) > Pw > pwL$, $R = rL$ |
| | then $R = rL + \Delta r$, $F = fm$, $W = wL$ |
| Rule 10: | if $(pwm - \Delta p) > Pw > pwL$, $R = rL$, $W = wL$ |
| | then $R = rB - \Delta r$, $F = fL$, $W = wL$ |
| Rule 11: | if $Pw \leq pwL$ |
| | then $R = rB$, $F = fL$, $W = wL$ |

After completion of the above preparation, yellow corn grits were deposited into the material tank, and the operation of the extruder was started. After setting the number of revolutions to 650 rpm, it was confirmed that the number of revolutions reached the set value and stabilized.

Thereafter, the hydration mixer was operated, and the grits were supplied in an amount of 200 kg/hr to the hydration mixer from the material tank, and at the same time, water was added thereto by the pump. The water content of the dough material was adjusted to 14%, and the operation was continued.

With this state, the specific power consumption value reached $Pw=(pwm\pm\Delta p)=144$ wh/kg (specific power consumption value=electric current×voltage×time/feed amount per hour), and products having a volume of 40 g per liter, a cutting stress of 450 gf, an average bubble size of 0.55 mm and a Hunter's notation value of 0.42 indicating a color tone property were stably produced.

(1) Control of Over-cooking State

From this state, the control values of the DC motor, the material feeder and the hydration pump were adjusted at random, to produce an over-cooking state.

As a result, with the specific power consumption value $Pw=170$ wh/kg, over-cooked products having a volume of 30 g per liter, a cutting stress of 250 gf, an average bubble size of 0.25 mm and a Hunter's notation value of 0.32 indicating a color tone property were produced.

Under this state, the condition was changed over to the computer managed condition using the control rule according to the present invention.

As a result, after two minutes, the specific power consumption value reached $Pw=(pwm\pm\Delta p)=145\pm 4$ wh/kg (specific power consumption value=electric current×voltage×time/feed amount per hour), and products having a volume of 40 g per liter, a cutting stress of 460 gf, an average bubble size of 0.5 mm and a Hunter's notation value of 0.40 indicating a color tone property were stably produced.

(2) Control of Under-cooking State

In the similar manner as (1) above, there was created such a state that the specific power consumption value reached $Pw=(pwm\pm\Delta p)=146$ wh/kg (specific power consumption value=electric current×voltage×time/feed amount per hour), and products having a volume of 41 g per liter, a cutting stress of 460 gf, an average bubble size of 0.50 mm and a Hunter's notation value of 0.40 indicating a color tone property were stably produced.

From this state, the control values of the DC motor, the material feeder and the hydration pump were adjusted at random, to produce an under-cooking state.

As a result, with the specific power consumption value $Pw=120$ wh/kg, under-cooked products having a volume of 55 g/liter, a cutting stress of 650 gf, an average bubble size of 0.80 mm and a Hunter's notation value of 0.48 indicating a color tone property were produced.

Under this state, the condition was changed over to the computer managed condition with the control rule according to the present invention.

As a result, after two minutes, the specific power consumption value reached $Pw=(pwm\pm\Delta p)=148\pm 4$ wh/kg (specific power consumption value=electric current×voltage/feed amount per hour), and products having a volume of 40 g per liter, a the cutting stress of 450 gf, the average bubble size of 0.53 mm and a Hunter's notation value of 0.41 indicating a color tone property were stably produced. According to the cooking control method for the food extruder of the present invention applying the fuzzy theory, a change in the various set values in the production process of the snack is immediately detected, and automatically corrected. Hence, products having stable quality can be continuously produced, without decreasing the productivity.

Moreover, since the cooking control of the expanded snack can be automatically performed, the number of extruders to be controlled by one operator can be increased, such that the present system can accommodate mass production.

What is claimed is:

1. A control method for a food extruder, comprising:
   determining a specific power consumption value by dividing electric energy consumed by the food extruder in a unit time by an amount of dough material supplied to the food extruder in the unit time;
   a specific power consumption value predetermined at a time of producing snacks having desired qualities as a reference value, and controlling the number of revolutions of the food extruder, when a difference between the reference value and the specific power consumption value is small; and
   when the difference between the reference value and the specific power consumption value is large, controlling the number of revolutions of said food extruder, an increase or decrease of an amount of water to be added to the food extruder, and an increase or decrease of amount of dough material to be supplied to the food extruder.

2. A control method for a food extruder according to claim 1, wherein the reference value corresponds to a value at which a snack having the desired qualities can be obtained, the snacks are evaluated based on eating texture, color tone and volume of the snacks, the eating texture is expressed by an evaluation value based on measured values of a bubble size of the snack and a cutting stress of the snack, said color tone is expressed by an evaluation value based on a value measured using a spectrophotometric colorimeter, the volume is expressed by an evaluation value based on a weight of the snack when placed in a container having a predetermined capacity, when there exists one or more defective evaluation values for the eating texture, the color tone and the volume, the snack is given a defective evaluation value, when there are no defective evaluation values for each of the eating texture, the color tone and the volume, each of the eating texture evaluation value, the color tone evaluation value and the volume evaluation value is multiplied by a weight coefficient, and a quality evaluation value is obtained from the sum of the eating texture evaluation value multiplied by said weight coefficient, the color tone evaluation value multiplied by said weight coefficient and the volume evaluation value multiplied by said weight coefficient.

3. A control method for a food extruder according to claim 1, wherein each of an upper limit, a lower limit and an adjusting value is determined for each of the number of revolutions of the food extruder, the amount of dough material supplied to the food extruder, and amount of water added to the food extruder at the time of production, using as central values the number of revolutions of the food extruder, the amount of dough material supplied to the food extruder and amount of water added to the food extruder at the time of producing snacks having desired qualities, a central value serves as said reference value and is compared with the specific power consumption value, and a result of the comparison is inputted into a set of rules based on a fuzzy theory, so as to control each of the number of revolutions of the food extruder, the amount of dough material supplied to the food extruder and amount of water added to the food extruder.

4. A control method for a food extruder according to claim 3, wherein each of an upper limit zone, a central zone and a lower limit zone is set in accordance with the central value, an upper limit and a lower limit of the specific power consumption value, each of the upper limit zone, the central zone and the lower limit zone having positive/negative adjusting values, and the set of rules based on the fuzzy theory comprises adding or subtracting an adjusting value consisting of a predetermined value to or from the number of revolutions of the food extruder within a range between the upper limit and the lower limit, in such a manner that:

when the specific power consumption value of the food extruder exists in the central zone formed of the reference value of the specific power consumption value, being the central value, adjusted with the positive/negative adjusting values, the amount of dough material supplied to the food extruder and amount of water added to the food extruder are kept constant;

when the specific power consumption value of the food extruder exists between said central zone and the upper limit, the number of revolutions of the food extruder is set to be the lower limit plus the adjusting value, and the amount of dough material supplied to the food extruder and amount of water added to the food extruder are set to be the central values;

when the specific power consumption value of the food extruder exists between said central zone and the upper limit and when the number of revolutions of the food extruder is present at the lower limit plus the adjusting value, the number of revolutions of the food extruder is set to be the lower limit, and the amount of dough material supplied to the food extruder and amount of water added to the food extruder are set to be the central values;

when the specific power consumption value of the food extruder exists between said central zone and the upper limit and when the number of revolutions of the food extruder is at the lower limit, the number of revolutions of the food extruder is set to be the lower limit, the amount of dough material supplied to the food extruder is set to be the central value, and amount of water added to the food extruder is set to be the upper limit;

when the specific power consumption value of the food extruder exists between said central zone and the upper limit and when the number of revolutions of the food extruder is at the lower limit and when amount of water added is at the upper limit, the number of revolutions of the food extruder is set to be the lower limit, and the amount of dough material supplied to the food extruder and amount of water added to the food extruder are set to be the upper limits;

when the specific power consumption value of the food extruder exists at the upper limit or above, the number of revolutions of the food extruder is set to be the lower limit, the amount of dough material supplied to the food extruder is set to be the upper limit, and amount of water added to the food extruder is set to be the upper limit;

when the specific power consumption value of the food extruder exists between the central zone and the lower limit, the number of revolutions of the food extruder is set to be the upper limit minus the adjusting value, the amount of dough material supplied to the food extruder is set to be the central value, and amount of water added to the food extruder is set to be the central value;

when the specific power consumption value of the food extruder exists between the central zone and the lower limit and when the number of revolutions of the food extruder is at the upper limit minus the adjusting value, the number of revolutions of the food extruder is set to be the upper limit, the amount of dough material supplied to the food extruder is set to be the central value, and amount of water added to the food extruder is set to be the central value;

when the specific power consumption value of the food extruder exists between the central zone and the lower limit and when the number of revolutions is at the lower limit, the number of revolutions of the food extruder is set to be the lower limit plus the adjusting value, the amount of dough material supplied to the food extruder is set to be the central value, and amount of water added to the food extruder is set to be the lower limit;

when the specific power consumption value of the food extruder exists between the central zone and the lower limit and when the number of revolutions of the food extruder and amount of water added to the food extruder are at the lower limits, the number of revolutions of the food extruder is set to be the upper limit minus the adjusting value, and the amount of dough material supplied to the food extruder and the amount of water added to the food extruder are set to be the lower limits; and when the specific power consumption value of the extruder exists at the lower limit or below, the number of revolutions of the food extruder is set to be the upper limit, and the amount of dough material supplied to the food extruder and amount of water added to the food extruder are set to be the lower limits.

5. A control method for a food extruder according to claim 2, wherein each of an upper limit, a lower limit and an adjusting value is determined for each of the number of revolutions of the food extruder, the amount of dough material supplied to the food extruder, and amount of water added to the food extruder at the time of production, using as central values the number of revolutions of the food extruder, the amount of dough material supplied to the food extruder and amount of water added to the food extruder at the time of producing snacks having desired qualities, a central value serves as said reference value and is compared with the specific power consumption value, and a result of the comparison is inputted into a set of rules based on a fuzzy theory, so as to control each of the number of revolutions of the food extruder, the amount of dough material supplied to the food extruder and amount of water added to the food extruder.

6. A control method for a food extruder according to claim 5, wherein each of an upper limit zone, a central zone and a lower limit zone is set in accordance with the central value, an upper limit and a lower limit of the specific power consumption value, each of the upper limit zone, the central zone and the lower limit zone having positive/negative adjusting values, and the set of rules based on the fuzzy theory comprises adding or subtracting an adjusting value consisting of a predetermined value to or from the number of revolutions of the food extruder within a range between the upper limit and the lower limit, in such a manner that:

when the specific power consumption value of the food extruder exists in the central zone formed of the reference value of the specific power consumption value, being the central value, adjusted with the positive/negative adjusting values, the amount of dough material supplied to the food extruder and amount of water added to the food extruder are kept constant;

when the specific power consumption value of the food extruder exists between said central zone and the upper limit, the number of revolutions of the food extruder is set to be the lower limit plus the adjusting value, and the amount of dough material supplied to the food extruder and amount of water added to the food extruder are set to be the central values;

when the specific power consumption value of the food extruder exists between said central zone and the upper limit and when the number of revolutions of the food extruder is present at the lower limit plus the adjusting value, the number of revolutions of the food extruder is set to be the lower limit, and the amount of dough material supplied to the food extruder and amount of water added to the food extruder are set to be the central values;

when the specific power consumption value of the food extruder exists between said central zone and the upper limit and when the number of revolutions of the food extruder is at the lower limit, the number of revolutions of the food extruder is set to be the lower limit, the amount of dough material supplied to the food extruder is set to be the central value, and amount of water added to the food extruder is set to be the upper limit;

when the specific power consumption value of the food extruder exists between said central zone and the upper limit and when the number of revolutions of the food extruder is at the lower limit and when amount of water added is at the upper limit, the number of revolutions of the food extruder is set to be the lower limit, the amount of dough material supplied to the food extruder and amount of water added to the food extruder are set to be the upper limits;

when the specific power consumption value of the food extruder exists at the upper limit or above, the number of revolutions of the food extruder is set to be the lower limit, the amount of dough material supplied to the food extruder is set to be the upper limit, and amount of water added to the food extruder is set to be the upper limit;

when the specific power consumption value of the food extruder exists between the central zone and the lower limit, the number of revolutions of the food extruder is set to be the upper limit minus the adjusting value, the amount of dough material supplied to the food extruder is set to be the central value, and amount of water added to the food extruder is set to be the central value;

when the specific power consumption value of the extruder exists between the central zone and the lower limit and when the number of revolutions of the food extruder is at the upper limit minus the adjusting value, the number of revolutions of the food extruder is set to be the upper limit, the amount of dough material supplied to the food extruder is set to be the central value, and amount of water added to the food extruder is set to be the central value;

when the specific power consumption value of the food extruder exists between the central zone and the lower limit and when the number of revolutions is at the lower limit, the number of revolutions of the food extruder is set to be the lower limit plus the adjusting value, the amount of dough material supplied to the food extruder is set to be the central value, and amount of water added to the food extruder is set to be the lower limit;

when the specific power consumption value of the food extruder exists between the central zone and the lower limit and when the number of revolutions of the food extruder and amount of water added to the food extruder are at the lower limits, the number of revolutions of the food extruder is set to be the upper limit minus the adjusting value, and the amount of dough material supplied to the food extruder and the amount of water added to the food extruder are set to be the lower limits; and when the specific power consumption value of the extruder exists at the lower limit or below, the number of revolutions of the food extruder is set to be the upper limit, and the amount of dough material supplied to the food extruder and amount of water added to the food extruder are set to be the lower limits.

* * * * *